Oct. 9, 1923.
F. W. LOVEJOY
1,469,815
PROCESS OF MAKING COMPOSITE FILMS
Original Filed May 5, 1922  2 Sheets-Sheet 1
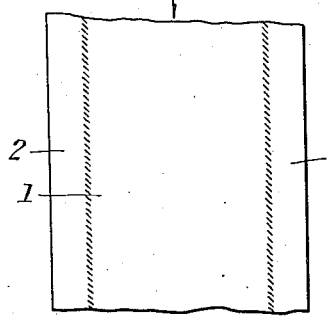
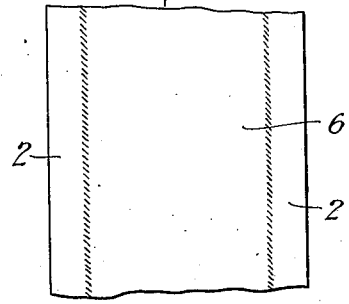
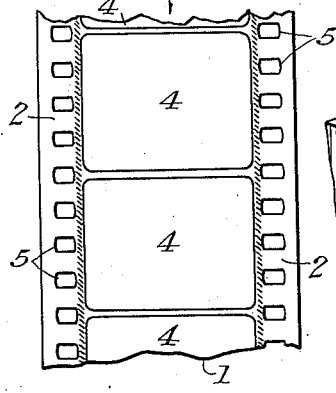
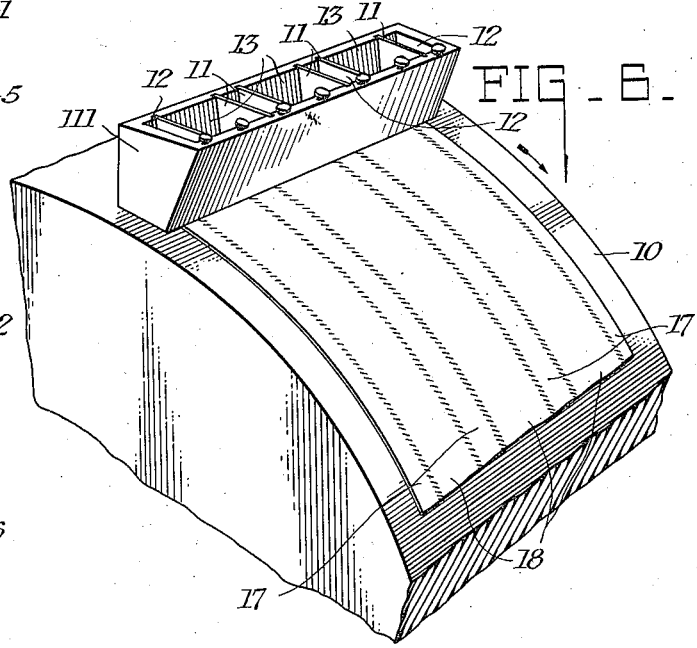
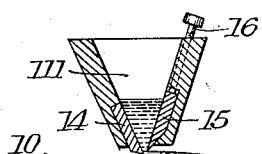
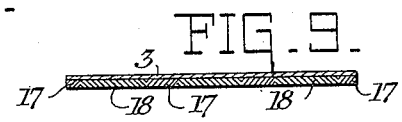
INVENTOR.
Frank W. Lovejoy,
BY R. L. Stinchfield
ATTORNEY

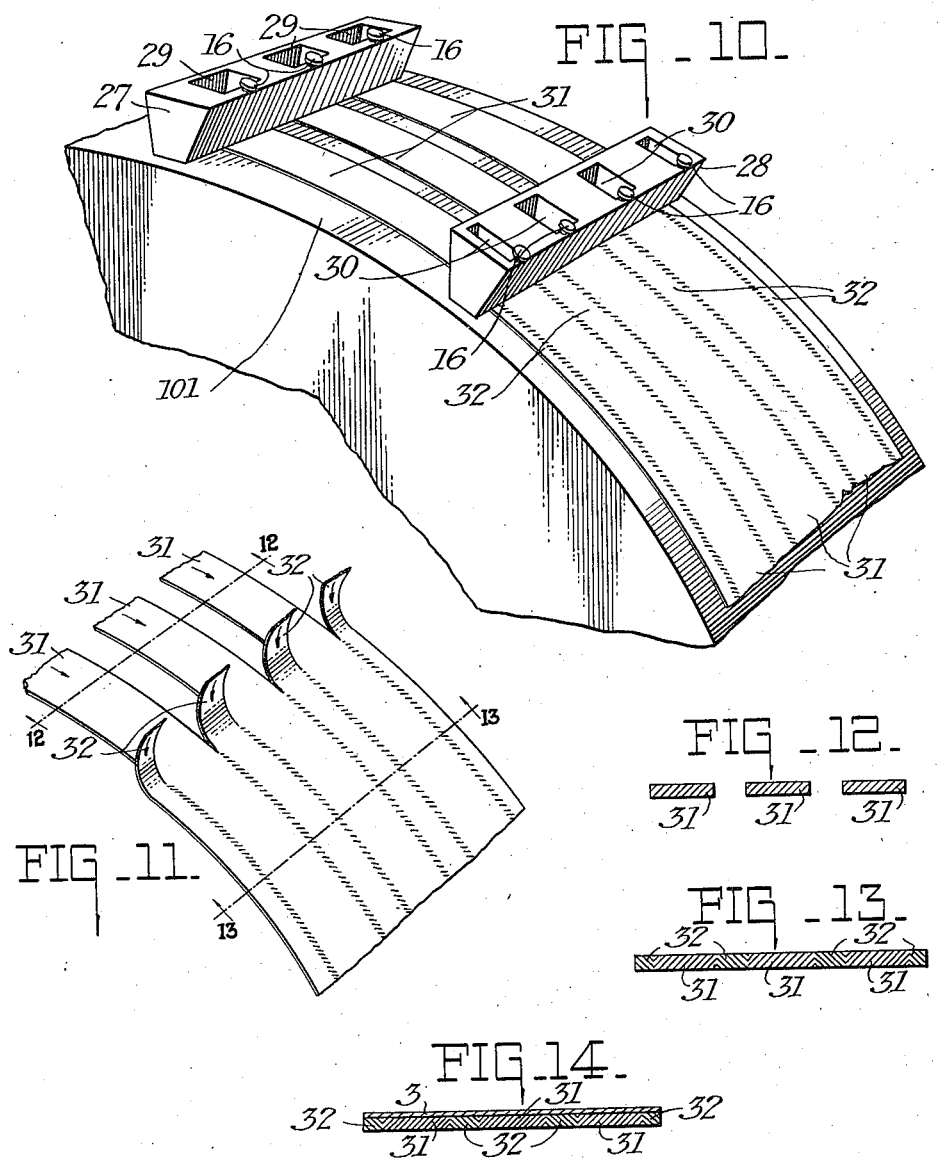

Patented Oct. 9, 1923.

1,469,815

UNITED STATES PATENT OFFICE.

FRANK W. LOVEJOY, OF ROCHESTER, NEW YORK, ASSIGNOR TO EASTMAN KODAK COMPANY, OF ROCHESTER, NEW YORK, A CORPORATION OF NEW YORK.

PROCESS OF MAKING COMPOSITE FILMS.

Original application filed May 5, 1922, Serial No. 558,747. Divided and this application filed June 24, 1922. Serial No. 570,640.

*To all whom it may concern:*

Be it known that I, FRANK W. LOVEJOY, a citizen of the United States of America, residing at Rochester, in the county of Monroe and State of New York, have invented certain new and useful Improvements in Processes of Making Composite Films, of which the following is a full, clear, and exact specification.

This invention relates to the making of composite film, and finds its widest application in the motion picture art. One object of my invention is to provide a process for making composite film in an accurate, rapid and economical way and in commercial lengths. Another object of my invention is to utilize a novel blank in said process. Other objects will hereinafter appear.

In the drawings,—

Figs. 1 and 3 are fragmentary plan views of composite films which may be made by my process;

Figs. 2 and 4 are sectional views illustrating two composite films which may be produced by my process, Figs. 2 and 4 showing respectively cross sections of the films in Figs. 1 and 3;

Fig. 5 is a fragmentary plan view of a composite motion picture film produced by my invention and having finished pictures thereon, as well as perforations in the margin;

Fig. 6 is a diagrammatic fragmentary perspective view showing an apparatus by which my process may be carried out;

Fig. 7 is a fragmentary sectional view of the apparatus shown in Fig. 6;

Fig. 8 is a cross section of a composite sheet or blank prepared by my process and apparatus illustrated in Figs. 6 and 7;

Fig. 9 is a cross section of the composite sheet or blank of Fig. 8 bearing a sensitive photographic layer;

Fig. 10 is a fragmentary diagrammatic perspective view illustrating still another apparatus by means of which my method may be carried out in the production of composite film;

Fig. 11 is a fragmentary diagrammatic perspective view showing one way of uniting the elements of a composite sheet or blank in my process;

Fig. 12 is a section taken on the line 12—12 of Fig. 11;

Fig. 13 is a section taken on the line 13—13 of Fig. 11;

Fig. 14 is a section of a composite sheet or blank coated with a photographically sensitive layer.

In all of the figures of the drawings the parts have been exaggerated, as regards size and relative proportions, in order to facilitate a clearer exposition of the invention.

A particularly useful composite film which may be made by my process is one in which the base contains relatively tougher sections which constitute the mechanical transmitting portions of the film. Such a film may have the portion which is subject to the greater heat action of more resistant material to combat such action. Thus the portion of the film support within the picture area, which will be most subject to heat during projection, may be made of a cellulosic material or a cellulosic addition compound of low inflammability, and the mechanical transmitting portion outside of the picture area, constituting the margins of the film, may be composed of a cellulosic material based upon a tougher cellulosic derivative compound.

Specific examples of such films are shown in Figs. 1 to 5 inclusive. In Figs. 1 and 2 there is disclosed a film having a central strip 1 composed of a cellulose acetate composition joined at its edges to nitrocellulose marginal strips 2 of substantially the same thickness as the central strip 1, the two respective strips being interunited,—that is, the union is affected by an intermingling of the strips at their contacting edges in a way probably analogous to a welded or soldered joint in metals. Upon the film base composed of strips 1 and 2 may be located any usual or preferred photographically sensitive layer 3. At the present time the most useful layer of this kind is a gelatino-silver-halid emulsion of the so-called positive type.

The area of strip 1 corresponds approximately to the area which will be occupied by pictures produced in layer 3, this area, therefore, being conveniently termed the "picture area", whether the layer 3 be in the sensitive state or whether pictures have been finally produced therefrom. Thus in Fig. 5 the pictures 4, indicated schematically by rectangles, have been prepared from the sensitive layer 3 and perforations 5 have been made in the marginal strips 2 for engagement with suitable driving mechanism of motion picture apparatus. While I prefer to have the cellulose acetate strips comprise rather more than the picture areas, they may comprise somewhat less of said areas. Preferably, however, they should be at least as large as the opening in the gate of a projector, in order that the rays may fall only on them, and in order that any irregularities occurring along the lines of union between the strips 1 and 2 may not affect the projected pictures.

The cellulose acetate compositions which may be employed in my process for making strips 1 in such composite films and the nitrocellulose compositions used in my process for making the strips 2 thereof may be of the usual types. I prefer to employ acetone-soluble cellulose acetate, because an interunion with the marginal strips is more easily effected. While certain modifying materials, such as camphor and camphor substitutes, like triphenyl phosphate, fusel oil, butyl alcohol, monochlornaphthalene, etc., are preferably employed in the proportions usual in film in proper admixture with the cellulosic materials of strips 1 and 2, nevertheless, those strips are substantially composed of the described addition compounds of cellulose, namely, cellulose acetate and cellulose nitrate. Cellulose acetate is typical of the fatty acid esters of cellulose. As is well known, such esters are less inflammable than nitrocellulose, while nitrocellulose material is in general tougher and more resistant to mechanical action than acetate material, particularly when the latter is best adapted to resist heat.

In Figs. 3 and 4 I have shown a modified film which may be produced by my process in which the central strip 6, instead of being composed of a cellulose acetate composition, is based upon another addition compound of cellulose,—namely, cellulose ether, of which ethyl cellulose that is insoluble in water at ordinary temperatures is typical. The marginal strips 2 of nitrocellulose material are interunited at their edges to the central strip 6, and the base is coated with the photographically sensitive layer 3.

One embodiment of my process for preparing such films is illustrated in Figs. 6 to 9 inclusive. Above a moving surface, such as that of a large smooth wheel 10 of the well known film-making type, is located a trough 111 divided by vertical partitions 11 into a series of separate compartments 12 which alternate with adjacent compartments 13. At the bottom of each compartment is a slot at right angles to the direction of movement of wheel 10, said slit being formed between blades 14 and adjustable edges 15, the latter being controlled by adjusting screws 16.

The compartments 12 may be charged with one composition and the compartments 13 with a different composition. The compositions are then allowed to flow out upon the moving wheel surface, thereby forming film strips which coalesce and interunite at their edges. Thus the compartments 12 may contain a nitrocellulose dope having considerable acetone as one of its volatile solvents, and compartments 13 may contain a cellulose acetate composition which also contains acetone. The ingredients are so proportioned and the edges 15 so adjusted that film strips of approximately the same thickness are formed on the moving surface. The dopes are also of such consistency that there will be just enough spreading to contact and weld the edges of the strips together while sufficient of the common solvent, like acetone, remains in the film to influence or effect such result. It will be noted that the strips are deposited in parallel relation on the film-forming surface and that they are held in this proper relative position by temporary adhesion to the smooth surface during the interunion of the edges and while such interunited edges and the strips themselves are setting. After sufficient volatile solvent has evaporated, the strips and joints between them acquire enough strength to permit the whole composite sheet or blank to be stripped from the film wheel surface, as will be well understood by those skilled in the film-making art.

The foregoing steps result in a sheet or composite blank indicated diagrammatically in section in Fig. 8, composed of alternate strips of nitrocellulose 17 and of cellulose acetate 18. The strips 18 are approximately as wide as the desired picture areas of the ultimate films. The strips 17 are, except for the two outer strips, of approximately double the width required in the marginal portions of the finished films. Of course, the outermost strips 17 will be relatively wider than is shown in Fig. 8, in order to provide an irregular so-called "safe edge" which is useful during the handling of the sheet in the process, but is finally cut off as waste. As the provision of a safe edge is well known to those skilled in the art, it has been omitted from the drawing for the sake of clearness. The useful portions of outermost strips 17 will, therefore, be of the width necessary for a single marginal portion of the film, as shown in Fig. 8.

On the composite sheet or blank thus prepared, which has a sufficiently even upper surface for that purpose, there is spread the photographically sensitive layer 3. Finally the blank is longitudinally slitted along the median lines of strips 17, except the outermost strips, thereby producing films of the character shown in Figs. 1 to 5 inclusive. Of course, the cellulose acetate in the above example can be replaced by any other of the previously indicated equivalent ingredients, such as cellulose ether, appropriate common solvents being employed in the flowable composition.

Figs. 10 to 14 inclusive illustrate a somewhat modified way of carrying out my process in order to produce the films shown in Figs. 1 to 5 inclusive. Referring to Fig. 10, the surface of the film wheel 101 of usual construction passes in succession beneath troughs 27 and 28, the former having a series of separated compartments 29 and the latter a series of separated compartments 30. All of these compartments are provided with film-forming slits, blades, adjustable edges and adjusting screws, as previously explained in connection with Figs. 6 and 7. The compartments 29 of the trough 27 are staggered or alternate with the compartments 30 of trough 28. In other words, strips 31 deposited from the compartments 29 upon the surface of wheel 101 will be carried by the latter beneath the trough 28 and between compartments 30, so that the strips 32 deposited from compartments 30 will pass into the spaces between strips 31 and fill such spaces. Because of the action of the common solvent the two sets of strips 31, 32 will unite together, as schematically indicated in Fig. 11, to form a composite sheet or blank, a section of this being shown in Fig. 13 (without the safe edge which is ultimately cut off as waste, as previously explained). Because of the temporary adherence of the strips to the wheel surface, said strips are always held very accurately in the proper relative positions for interuniting. The viscosities of the cellulosic dopes in compartments 29 and 30 are maintained at the best relative values to effect a proper deposition and interunion of the strips, the rate of travel of the film-forming surface being taken into consideration. For example, the amount of volatile solvents in the dopes may be varied. The temperatures of the troughs and surface may be altered or other expedients known to those skilled in the film-making art may be employed. Sufficient common solvent, like acetone, should be, of course, used in the dopes in compartments 30 to enable an interunion of the strips to take place quickly on the face of wheel 10.

The compartments 29 are proportioned to form strips 31 of cellulose acetate or cellulose ether, or the like, of sufficient width to constitute the picture areas or projection portions of the finished film strips. The compartments 30 are proportioned to provide strips 32 out of which marginal portions of the ultimate film may be formed when the blank is properly slitted. Preferably the compartments 30 are approximately as wide as or slightly wider than the spaces between the compartments 29, particularly if the dopes employed require a slight overlapping of the strips while in a plastic condition, to insure better union between them.

As indicated in Fig. 14, the composite sheet or blank may be used as a support for the usual photographically sensitive coating 3. The combination is then slit longitudinally through the strips 32 along the median lines of the latter, except the outermost ones, thereby producing films of the type disclosed in Figs. 1 to 5 inclusive.

Because of the adherence of the strips to the film-forming surface, my process is an accurate one. Since practically the entire materials employed in the process enter into the finished product with only a negligible amount of waste, and since the process may be carried out with only a few relatively simple operations, my process is economical. By depositing the strips so that they interunite and are temporarily held until set on a suitable surface and then stripping them off, films of practically any desired length can be formed by keeping the apparatus properly charged with the film-forming compositions.

This application is a division of my prior case Serial No. 558,747, filed May 5, 1922, for photographic film.

Having thus described my invention, what I claim as new and desire to secure by Letters Patent is:

1. The process of making a composite cellulosic film, which comprises the steps of shaping film strips from colloidal cellulosic material containing a volatile solvent and contacting the edges of said strips to interunite the same under the action of said solvent while sufficient of the latter for said interuniting still remains in said strips.

2. The process of making a composite cellulosic film, which comprises the steps of depositing film strips from flowable compositions containing different cellulosic compounds and a common solvent of said compounds, and contacting the edges of said strips to interunite the same under the influence of said common solvent while sufficient of the latter is still present in said strips.

3. The process of making a composite cellulosic film which comprises the steps of depositing cellulose nitrate strips and cellulose acetate strips from flowable compositions containing said nitrate and said acetate, at least one of said compositions containing a common solvent of said nitrate and acetate, and contacting the edges of said strips to interunite the same under the action of said solvent.

4. The process of making a composite cellulosic film, which comprises the steps of depositing film strips from flowable compositions of cellulose nitrate and of cellulose acetate, each composition containing acetone, and contacting the edges of said strips to interunite the same by the action of the acetone.

5. The process of making a composite cellulosic film which comprises shaping film strips on a film-forming surface from flowable cellulosic material containing a volatile solvent, the edges of said strips being in interuniting contact while sufficient of said solvent for interuniting remains in said strips, said strips being retained in relative position, during the setting of said interunited edges, by adhereing to said surface.

6. The process of making a composite film which comprises depositing film strips on a film-forming surface from flowable compositions containing different cellulosic compounds and a common solvent of said compounds, the relative positions of said strips on said surface being with their edges in interuniting contact and said positions being taken while sufficient of said solvent remains in said edges to allow said interuniting, said strips being retained in said positions during the setting of said interunited edges by adherence to said surface.

7. The process of making a composite film, which comprises depositing cellulose nitrate and cellulose acetate strips on a film-forming surface from flowable compositions containing said nitrate and said acetate, at least one of said compositions containing a common solvent of said nitrate and acetate, the relative positions of said strips on said surface being with their edges in interuniting contact and said positions being taken while sufficient of said solvent remains in said edges to allow said interuniting, said strips being retained in said positions, during the setting of said interunited edges, by adherence to said surface, and finally stripping the composite film, thus formed, from said surface.

8. The process of making a composite film, which comprises depositing parallel strips of cellulose nitrate and cellulose acetate of substantially equal thickness along the smooth cylindrical surface of a film wheel from a flowable cellulose nitrate composition and a flowable cellulose acetate composition, each composition containing acetone, the edges of said strips moving into interuniting contact while sufficient acetone remains in said edges to allow said interuniting, said strips adhering to said surface while they and their interunited edges set, and finally stripping the composite film thus formed from said surface.

9. The process of making composite films, which comprises the steps of interuniting into a single sheet sets of film strips, each set comprising a different cellulosic compound, coating said sheet with a photographically sensitive layer, and cutting the coated sheet through the strips of one of said sets.

10. The process of making composite film, which comprises the steps of interuniting into a single sheet alternate film strips of cellulose nitrate and cellulose acetate, coating said sheet with a photographically sensitive layer, and cutting longitudinally through said cellulose nitrate strips.

11. The process of making composite film, which comprises the steps of interuniting into a single sheet alternate parallel film strips of cellulose nitrate and cellulose acetate, said acetate strips being approximately of the width of picture areas of motion picture film and the nitrate strips between said strips being approximately twice the width of a border of motion picture film, coating said sheet with a gelatino-silver-halid layer, and dividing said coated sheet into composite motion picture films by cutting longitudinally along the median line of each cellulose nitrate strip.

12. The process of making composite film, which comprises the steps of coating with a photographically sensitive layer a sheet having two alternating sets of film strips interunited at their edges, the strips of one set being of one cellulosic compound and corresponding in width to a picture area and the strips of the second set being of a different cellulosic compound and corresponding in width to a pair of borders, and cutting the coated sheet along the longitudinal median lines of said second set of strips.

13. A blank in the process of making composite film, which comprises a photographically sensitive layer and a supporting sheet therefor, said sheet comprising sets of film strips of cellulosic material joined at their edges, one set of strips being of one cellulosic compound and another set being of a different cellulosic compound.

14. A blank in the process of making composite film, which comprises a light sensitive gelatino-silver-halid layer and a supporting sheet therefor, said sheet comprising alternating parallel film strips of cellulose nitrate and cellulose acetate joined at their edges.

Signed at Rochester, New York, this 16th day of June, 1922.

FRANK W. LOVEJOY.